United States Patent
Heucher et al.

(10) Patent No.: US 6,258,885 B1
(45) Date of Patent: *Jul. 10, 2001

(54) FILLING COMPOUND

(75) Inventors: Reimar Heucher, Pulheim; Juergen Wichelhaus, Wuppertal; Johannes Andres, Hilden, all of (DE)

(73) Assignee: Henkel Kommanditgesellschaft auf Aktien, Duesseldorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/229,813

(22) Filed: Jan. 13, 1999

Related U.S. Application Data

(62) Continuation of application No. 08/747,053, filed on Nov. 12, 1996, now Pat. No. 5,902,849, which is a continuation of application No. 08/232,290, filed as application No. PCT/EP92/02475 on Oct. 29, 1992, now abandoned.

(30) Foreign Application Priority Data

Nov. 4, 1991 (DE) .................................................. 41 36 617

(51) Int. Cl.$^7$ .............................. C08K 5/01; C08L 23/22; C10M 107/00
(52) U.S. Cl. .................... 524/484; 524/271; 524/274; 524/583; 524/586; 524/587; 523/173; 585/10; 585/12
(58) Field of Search ..................... 524/484, 271, 524/274, 583, 586, 587; 523/173; 585/10, 12

(56) References Cited

U.S. PATENT DOCUMENTS

| | | | |
|---|---|---|---|
| 4,282,392 | 8/1981 | Cupples et ak. | 585/10 |
| 4,361,508 | 11/1982 | Bourland | 523/173 |
| 4,701,016 | 10/1987 | Gartside, III, et al. | 350/96.23 |
| 4,707,016 | 10/1987 | Gartside, III et al. | 523/173 |
| 4,749,502 | 6/1988 | Alexander et al. | 252/35 |
| 4,757,100 | 8/1985 | Wichelhaus et al. | 523/173 |
| 4,787,703 | 11/1988 | Tomko et al. | 350/96.23 |
| 4,798,853 | 1/1989 | Handlin, Jr. | 523/173 |
| 4,810,395 | 3/1989 | Levy et al. | 252/28 |
| 4,827,064 | 5/1989 | Wu | 585/10 |
| 4,912,272 | 3/1990 | Wu | 585/10 |
| 4,971,419 | 11/1990 | Garrside et al. | 350/96.23 |
| 5,105,051 | 4/1992 | Pelnne et al. | 585/528 |
| 5,187,763 | 2/1993 | Tu | 523/173 |
| 5,233,116 | 8/1993 | Sanderson et al. | 585/533 |
| 5,243,114 | 9/1993 | Johnson et al. | 585/319 |
| 5,256,705 | 10/1993 | Freeman | 523/173 |
| 5,276,757 | 1/1997 | Levy et al. | 523/173 |
| 5,335,302 | 8/1994 | Pelle | 523/173 |
| 5,354,487 | 10/1994 | Acki et al. | 525/236 |
| 5,902,849 | * 5/1999 | Heucher et al. | 524/484 |

FOREIGN PATENT DOCUMENTS

| | | |
|---|---|---|
| 2003865 | 5/1990 | (CA) . |
| 931421 | of 0000 | (DE) . |
| 1931421 | 1/1991 | (DE) . |
| 4136617 | 7/1991 | (DE) . |
| 0612345 | 2/1997 | (DE) . |
| 0039867 | 11/1981 | (EP) . |
| 0029198 | 7/1984 | (EP) . |
| 0137203 | 4/1985 | (EP) . |
| 0182530 | 5/1986 | (EP) . |
| 0206234 | 12/1986 | (EP) . |
| 0213997 | 3/1987 | (EP) . |
| 0081851 | 10/1988 | (EP) . |
| 0371374 | 6/1990 | (EP) . |
| 0422573 | 4/1991 | (EP) . |
| 0510967 | 10/1992 | (EP) . |
| 0210252 | 3/1993 | (EP) . |
| 1592085 | 5/1970 | (FR) . |
| 2607311 | 11/1986 | (FR) . |
| 2607311 | 3/1988 | (FR) . |
| 2644004 | 9/1990 | (FR) . |
| 2167084 | 5/1986 | (GB) . |
| WO 88/08440 | 11/1988 | (WO) . |
| WO88/08440 | 11/1988 | (WO) . |
| 8912662 | 12/1989 | (WO) . |
| WO 89/12662 | 12/1989 | (WO) . |
| 9010050 | 9/1990 | (WO) . |
| WO 90/10050 | 9/1990 | (WO) . |

OTHER PUBLICATIONS

Deutsches Patentant dated Dec. 11, 1997 –Akrenzeichen: P 61 36 617.4–45.

(List continued on next page.)

*Primary Examiner*—James J. Seidleck
*Assistant Examiner*—Olga Asinovsky
(74) *Attorney, Agent, or Firm*—Wayne C. Jaeschke; Stephen D. Harper

(57) ABSTRACT

A filling compound for electrical and optical equipment in the form of cables, connectors, plugs, etc. and to assemblies thus produced, is provided. Electrical and optical equipment in the form of cables, connectors, plugs, etc. have to be protected against harmful influences penetrating from outside, particularly water, and also against mechanical damage during laying or as a result of exposure to heat. The filling compound is based on a stellate substance, i.e. a substance having a branched molecular structure in which, ideally, 3 or more branches, more particularly polymeric chains, radiate from a single branching point. The filling compound is flexible at very low temperatures but, on the other hand, does not run out, even at extremely high temperatures.

33 Claims, No Drawings

OTHER PUBLICATIONS

Motsch & Antritter dated Dec. 11, 1997 –Aktenzeichen: P 41 36 617.4–45.
Ltr dated Sept. 17, 1997 to Motsch & Antritter from Mobil Bus Resources Corp. (L.F. Cuoma).
Michael Huber Muenchen dated 1997–07–03 to Sehr geehrter Herr Jakob.
Gerhard D. Schwpfner Letter dated 12 November 1997 1997 re: Deutsches Patent 41 36 617.
Siemens (Benz) Re: Anmeldung Nr. 92922740.3 dated Mar. 11, 1997.
DIN–Sicherheitsdatenblatt –Datum Sep. 29, 1989.
Application for Canadian Patent –EP A –371 374 D3.
Offenlegugsschrift 1932421 –Jun. 20, 1969.
Mitteilung von eisprüchen, from the European Patent Office to Henkel Kommanditgesellschaft auf Aktien dated Dec. 23,1997.
Mitteilung eines einspruchs, from the European Patent Office to Henkel Kommaditgesellschaft auf Aktien dated Nov. 10, 1997.
Mitteilung eines einspruchs, from the European Patent Office to Henkel Komanditgesellschaft auf Aktien dated Nov. 13, 1997 –Attached letter and Mobil Technical Bulletin SHF–82.
Mitteilung eines einspruchs, from the European Patent Office to Henkel Kommanditgesellschaft auf Akrien dated Aug. 25, 1997.
Einspruch gegen ein europäisches Patent dated Feb. 5, 1997.
Tatsachenworbringen und Bergrundung (No date available).
Ullmanns Encyklopädie der Technischen Chemie, Verlag Chemie, Weinheim, Bergstr., 11, p. 460.
Mitteilung eines einspruchs, from the European Patent Office to Nenkel Kommanditgesellschaft auf Aktien dated Nov. 17, 1997.
European Patent Office from Stephenson Harwood dated Aug. 22, 1996.
Mitteilung eines einspruchs, from the European Patent Office to Henkel Kommanditgesellschaft auf Aktien dated Nov. 11, 1997 –Attached memo from Gerhard D. Schupfner dated Nov. 5, 1997.
Mitteilung eines einspruchs, from the European Patent Office to Henkel Kommanditgesellschaft auf Aktien dated Nov. 6, 1997.
Memo from Gerhard D. Schupfner to Europaisches Patentamt dated Oktober 29, 1997.
Notice of Opposition to a European Patent dated Feb. 5, 1997.
Facts and Areguments –European Patent No. 0 612 365B dated Oct. 31, 1997.
Technical Bulletin Shell Chemical Co., Article Kraton Thermoplastic Rubbers In Oil Gels, oo. 3–10 (No date).

* cited by examiner

FILLING COMPOUND

This is a continuation of application Ser. No. 08/747,053, filed Nov. 12, 1996, now U.S. Pat. No. 5,902,849, which is a continuation of application Ser. No. 08/232,290, filed May 6, 1994, now abandoned which is a 371 of PCT/EP92/02475 filed Oct. 29, 1992.

BACKGROUND OF THE INVENTION

1. Field of the Invention

This invention relates to a filling compound for electrical and optical equipment in the form of cables, connectors, plugs etc. and to assemblies thus produced.

2. Discussion of Related Art

Electrical and optical equipment in the form of cables, connectors, plugs etc. has to be protected against harmful influences penetrating from outside, particularly water, and also against mechanical damage during laying or as a result of exposure to heat. This is because moisture penetrating at a given point spreads and thus adversely affects the performance of the line. This problem has been known for some time and various measures have already been proposed with a view to solving it. Thus, EP 0 206 234-B1 describes a filling compound consisting of 65 to 90% by weight mineral oil, 2 to 25% by weight of an organic thickener, more particularly a poly-α-olefin, 2 to 10% by weight of a highly disperse silica and, optionally, 0.2 to 10% by weight hollow microbeads and 0.1 to 5% by weight of a dispersant. Substantially the same composition is described in FR-PS 2 644 004.

Although compositions of the type in question are capable of satisfying the stringent requirements of the cable industry both in regard to performance properties and in regard to processability, even more exacting requirements, particularly in regard to extreme temperature influences, are now being imposed for certain applications. Thus, on the one hand, the filling compound should still be flexible at very low temperatures but, on the other hand, should not run out, even at extremely high temperatures. In addition, the filling compound should have a high flash point. The other requirements which filling compounds for electrical and optical equipment in the form of cables, connectors, plugs, etc. are normally expected to meet should of course still be satisfied. Depending on the particular application involved, these other requirements may relate, for example, to the

- dielectric constant
- dielectric strength
- resistivity
- filler absorption by surrounding materials
- water (vapor) permeation.

SUMMARY OF THE INVENTION

Accordingly, the problem addressed by the present invention was to provide a filling compound which would show improved properties at extreme temperatures, but which would still satisfy the usual requirements and, in particular, would be easy to process.

The solution to this problem as provided by the present invention is defined in the claims and lies essentially in the choice of a stellate substance as the basis of the filling compound.

DETAILED DESCRIPTION OF THE INVENTION

In the context of the invention, a "stellate substance" is understood to be a substance having a branched molecular structure in which, ideally, 3 or more branches, more particularly polymeric chains, for example HC—(CH$_2$—O—CO—C$_9$H$_{19}$)$_3$, radiate from a single branching point. However, the expression "stellate substance" is also intended to encompass branched substances having several branching points providing the intervals between them are small by comparison with the length of the side chain. The ratio of the atoms forming the main chain to the atoms forming the side chain should be 1:3 or less. In the case of tridec-1-ene with the structural formula H—[CH$_2$CH(C$_8$H$_{17}$)—]$_3$ H, it is 1:4. The stellate substance should best have a viscosity in the range from 10 to 500 and preferably in the range from 20 to 60 mm$^2$/s (cST) at 40° C., as determined in accordance with ASTM D445. The pour point according to ASTM D97 should be below −25° C. and is preferably below −50° C.

One example of a suitable stellate substance is the polyester of a triol and monocarboxylic acids: CH$_3$—C(—CH$_2$—O—CO—alkyl)$_3$. It may be prepared at 100 to 200° C. in the presence of an acid catalyst with toluene as entraining agent. Polyol esters such as these are known to be used for the production of synthetic lubricating oils.

However, the stellate substance is preferably a poly-α-olefin. It is prepared by oligomerization of ethylene, for example to dec-1-ene, in a first step. The dec-1-ene is then worked up by distillation and subjected to catalytic hydrogenation to eliminate double bonds. Aliphatic liquids consisting solely of carbon and hydrogen are obtained in this way. The preferred poly-α-olefin is oligodec-1-ene which has the following structure: H—[CH$_2$—CH(C$_8$H$_{17}$)—]$_n$ H with n≧3. It is obtainable from Henkel Corporation (Emery).

In addition to the stellate substance, the filling compound best contains a mineral oil. In the context of the invention, a mineral oil is understood to be the liquid distillation product of mineral raw materials, such as petroleum, lignite, hard coal, wood and peat, which consist essentially of mixtures of saturated hydrocarbons. The mineral oil should be added in a quantity of 0 to 10% by weight and preferably in a quantity of 1 to 5% by weight, based on the stellate material.

A highly disperse silica is best added as a further constituent in a quantity of 0 to 15% by weight and preferably in a quantity of 0.5 to 6% by weight highly disperse silica, based on the stellate material. In the context of the invention, highly disperse silica is understood primarily to be pyrogenic silica although other highly disperse silicas may also be used. They preferably have a particle size of 0.007 to 0.05 and, more preferably, between 0.007 and 0.014 micrometers and an apparent density of 20 to 120 and preferably 35 to 40 g per liter. Suitable silicas are commercially obtainable in the form of Cab-O-Sil (Cabot Corporation), Aerosil (Degussa AG) and HDK (Wacker-Chemie).

The addition of silica results above all in plastic flow behavior. By this is meant the property whereby the filling compound is unable to flow under its own weight. Accordingly, for shear stress values below the yield point, the disperse system behaves like a solid and, as such, is elastically deformable. The dispersion only flows when the yield point is exceeded.

A high molecular weight polyolefin is recommended as a further constituent in a quantity of 0 to 10% by weight and preferably in a quantity of 0.05 to 2% by weight. High molecular weight polyolefins are understood to be homopolymers and copolymers of alkenes having a molecular weight of at least 0.5 million and preferably more than 2 million. Suitable high molecular weight polyolefins are polyethylenes, polypropylenes, polyisobutylenes and, preferably, polybutenes and mixtures and copolymers thereof. In a preferred embodiment, both silica and a high molecular weight polyolefin are added.

However, it may even be useful to add one or more viscosity index improvers to the stellate substance as an additional component in a quantity of 1 to 20% by weight, based on the stellate substance. Viscosity behavior is thus improved to the extent that viscosity does not decrease with increasing temperature as would normally be the case. The viscosity index improvers are polymers having an average molecular weight in the range from 10,000 to 100,000 and preferably in the range from 10,000 to 20,000. Known viscosity index improvers are polyisobutenes, diene polymers, copolymers of ethylene and propylene and polyalkyl styrenes. Among the known viscosity index improvers, compounds suitable for the purposes of the invention are selected above all for the following two properties: they should be inert to the cable materials and should show poor solubility in the stellate material at low temperatures and good solubility therein at high temperatures. A hydrogenated copolymer of isoprene and styrene (Shellvis 50, a Shell product) has proved to be particularly useful.

In addition, the filling compounds according to the invention may contain dispersion aids. Suitable dispersion aids are polycondensates, more particularly polycondensates based on hydrophobic and hydrophilic components. Thus, polycondensates synthesized at least partly from dimer fatty acids or the corresponding diamines may be used. Suitable condensates are polyamides of dimer fatty acids and diamines or polyesters of dimer fatty acids and polyhydric alcohols (functionality 2 or 3). Mixed types may also be used. Amino-terminated polycondensates are preferred. For example, polycondensates of a long-chain dicarboxylic acid with one or more diamines or triamines, more particularly condensation products of dimer fatty acids, trimer fatty acids, monomeric fatty acids and primary or secondary diamines containing 2 to 36 carbon atoms (dimer fatty amine), are suitable. Polycondensates of dicarboxylic acids with cyclic diamines, such as piperazine, may also be used. The dimer fatty acids may also be replaced to a small extent by short-chain dicarboxylic acids, for example sebacic acid or adipic acid. In many cases, the polycondensates are preferably terminated by amino groups. Amine values of 80 to 400 and, more particularly, in the range from 190 to 230 are favorable. For example, a preferred material has these characteristic values and, in addition, a viscosity of 0.3 to 4 Pas at 75° C. while other suitable products have a viscosity of 0.7 to 1.2 Pas at 150° C. If desired, the oligomeric dispersants may also be completely or partly replaced by fatty acid esters and/or fatty alcohol ethers.

The filling compounds according to the invention may contain auxiliaries typically encountered in such preparations as further constituents. For example, they may contain antioxidants, dyes or even corrosion inhibitors.

The filling compounds may be produced using any effective, but non-aggressive mixing units which provide for effective compounding, even at low speeds, for example so-called turbulent mixers.

The filling compounds according to the invention may readily be pumped at temperatures ranging from room temperature to moderately elevated temperatures of up to 60° C. No breaks, no entrapped air and no vacuoles are observed during their transport. The filling compounds according to the invention may also be poured into molds without difficulty, the molds being completely filled without any bubbles.

The filling compounds according to the invention are suitable for protecting electrical components of various kinds, such as for example cables, plugs, connectors, communications cables or even optical cables, against the penetration of harmful influences, particularly moisture. The filling compounds are also suitable for protecting optical cables of glass against the mechanical damage which can occur during laying as a result of bending and exposure to low temperatures. In addition, the filling compounds according to the invention may be used as repair sealants, for example when electrical lines or components have been deinsulated or damaged in the course of laying and have to be reinsulated.

The filling compounds according to the invention show a number of outstanding technical properties. Thus, their insulation resistance is high as is their specific volume resistance factor. Their dielectric constant is low, i.e. values below 2.3 and even below 2 can be adjusted. The specific gravity of preferred filling compounds is below 1. They are compatible with various plastics of the type used in electrical components and cables. Thus, the constituents of the filling compounds show hardly an penetration into plastics and have no effect on standard cable sheath materials. The filling compounds are absolutely stable up to temperatures of 100° C. and do not flow so that they do not run even in the event of damage at such temperatures. In addition, the filling compounds are flexible and retain their flexibility at temperatures down to −50° C. without any drastic change in their rheological properties and without any cracks developing under stress at low temperatures. In addition, the filling compounds according to the invention are readily processable, i.e. they may be introduced under moderate pressure into the cable sheaths to be filled at temperatures below 60° C., reaching even the most inaccessible places.

All the filling compounds according to the invention satisfy the following requirements:

Flash point in ° C. according to DIN ISO 2592: >200° C.,

Dielectric constant at 20° C. according to DIN 53483: <2.3,

Volume resistivity at 100° C. in cm according to DIN 53482: >$10^{10}$,

Viscosity at 20° C.: for example <20 Pa.s at $D=20s^{-1}$,

Cone penetration according to DIN 51580 at −40° C.>250 [1/10 mm] or at −50° C.>200 mm/10 and Weight increase in the cable sheath PE (70° C./10 d): <5%.

The properties mentioned above were determined by the following methods:

Density by weighing a defined bubble-free volume (>100 ml) of the mass to be determined at the measuring temperature. The calculation is carried out in known manner.

The increase in weight is determined in accordance with DIN 57472: test plates measuring 40×40×3 mm are stored in the filling compound for 10 days at 70° C. The difference is gravimetrically determined.

The flash point is determined in accordance with DIN ISO 2592.

Dripping behavior is determined by a net/sieve test:

Fed. Test method STD. NO. 791 B or

JIS K 2220, page 7 or

CNET ST LAA/ELR/CSD/543, all of which are based on the separation of oil from 10 g filling compound through a conical wire gauze with a mesh width of −250 μm. In the present case, the test duration and temperature were fixed at 24 hours and +80° C.

In order to demonstrate the advantageous properties, above all in regard to flexibility at low temperatures and durability, the compounds according to the invention were compared with those of the Comparison Examples using the following test methods:

Method I

Resistance to flow, dripping test according to FTM STD No. 791 B or JIS, K 2220, page 7

Method II

Cone penetration according to DIN 51580

Method III

Measurement of flow curve/viscosity

Instrument: Contraves DIN 125

The invention is illustrated by the following Examples:

A) Components used
  a) Synthetic oil, α-olefin copolymer, SAP 601, a product of Shell, typical data: Kinematic viscosity mm$^2$/s, 40° C.=30.5 mm$^2$/s Flash point: 238° C. ASTM D92 Pour point: −68° C. ASTM D97
  b) Shellvis 50, a styrene/isoprene copolymer (hydrogenated), supplier: Shell
  c) Silica: Cab-o-Sil M5 (a product of Cabot), Typical values: BET surface 200±25 m$^2$/g, Particle size: approx. 14·10$^{-9}$ m
  d) A 247 (a product of Henkel Corp., USA) 5.6% solution of a high molecular weight poly-(iso)butene in mineral oil and esters.

B) Production of the filling compounds, including characterization

Filling compound: Example 1
  621.6 kg SAP 601 were introduced into a 1,000 liter capacity turbulent mixer, 78.4 kg Shellvis 50 were added at room temperature and homogeneously distributed by mixing. The temperature was increased to 120–130° C. using indirect steam, followed by mixing until all the solid particles had dissolved. This was verified by coating onto a glass plate and testing viscosity and yield point. When a positive result had been obtained, a vacuum was applied and the product was run off bubble-free through a filter into suitable packs.

Filling compound: Example 2
  658 kg SAP 601 were introduced into a mixer (see Example 1), 7 kg A 247 were added and homogeneously distributed or dissolved at room temperature. During heating to approx. 120 to 130° C. by indirect steam, 35 kg Cab-O-Sil MS were added in portions and homogeneously distributed by mixing. Verification and characterization were carried out as described in Example 1. After evacuation, the product was run off bubble-free through a filter into suitable packs.

TABLE 1

Composition (in % by weight) and properties of compounds according to the invention

| Raw materials | 1 | 2 |
|---|---|---|
| PAO 6 | 88.8 | 94 |
| Silica | — | 5.0 |
| Shellvis 50 | 11.2 | — |
| A 247 | — | 1.0 |
| Non-drip | | |
| 24 h/80° C. | 0 | 0 |

TABLE 1-continued

Composition (in % by weight) and properties of compounds according to the invention

| Raw materials | 1 | 2 |
|---|---|---|
| Cone penetration in mm/10 | | |
| at +20° C. | 420 | 395 |
| at −40° C. | 280 | 240 |
| Viscosity in Pa · s | | |
| at D = 20s$^{-1}$ | 9.5 | 15 |

What is claimed is:

1. A filling compound for electrical and optical equipment comprising at least one stellate substance selected from the group consisting of polyolefins wherein the ratio of carbon atoms forming the main chain to carbon atoms forming the side chains is less than 1:3 and polyesters having at least three ester containing groups radiating from a single branching point, wherein the stellate substance has a viscosity of from 10 to 500 mm$^2$/s at 40° C. according to ASTM D445 and wherein the filling compound does not contain an inorganic thixotropic agent.

2. The filling compound as claimed in claim 1 wherein said stellate substance comprises a poly-α-olefin having a degree of oligomerization of at least 3.

3. The filling compound as claimed in claim 1 wherein said stellate substance is an oligodec-1-ene.

4. The filling compound as claimed in claim 1 further comprising mineral oil.

5. The filling compound as claimed in claim 4 wherein said mineral oil is present in a quantity of 1 to 5% by weight based on the weight of said stellate substance.

6. The filling compound as claimed in claim 1 further comprising a viscosity index improver.

7. The filling compound as claimed in claim 6 wherein said viscosity index improver is present in an amount of 1% to 20% by weight based on the weight of said stellate substance.

8. The filling compound as claimed in claim 6 wherein said viscosity index improver is a polymer having an average molecular weight in the range from 10,000 to 100,000.

9. The filling compound as claimed in claim 6 wherein said viscosity index improver is a polymer having an average molecular weight in the range from 10,000 to 20,000.

10. The filling compound as claimed in claim 6 wherein said viscosity index improver is selected from the group consisting of polyisobutenes, diene polymers, copolymers of ethylene and propylene, polyalkyl styrenes, and hydrogenated copolymers of isoprene and styrene.

11. The filling compound as claimed in claim 6 wherein said viscosity index improver has poor solubility in said stellate substance at low temperatures and good solubility therein at high temperatures.

12. The filling compound as claimed in claim 1 wherein said filling compound contains a hydrocarbon stellate substance and has a cone penetration of more than 200 mm/10 at −50° C. and resistance to flow up to a temperature of at least 80° C.

13. The filling compound as claimed in claim 12 wherein said filling compound has a flash point according to DIN ISO 2592 greater than 200° C., a dielectric constant at 20° C. according to DIN 53483 of less than 2.3, a volume resistivity at 100° C. in cm according to DIN 53482 greater than 10$^{10}$, a viscosity at 20° C. of less than 20 Pa.s at D=20 s$^{-1}$, a cone penetration according to DIN 51580 at −40° C.

of greater than 250 mm/10 or at −50° C. of greater than 200 mm/10 and, a weight increase in the cable sheath PE at 70° C. over 10 days of less than 5%.

14. The filling compound as claimed in claim 12 wherein said hydrocarbon stellate substance is an oligodec-1-ene having a degree of oligomerization of at least 3.

15. The filling compound as claimed in claim 1 comprising a stellate substance comprising an oligodec-1-ene having a degree of oligomerization of at least 3 and from 1% to 20% by weight, based on the weight of said stellate substance, of a viscosity index improver, said viscosity index improver-comprising a hydrogenated copolymer of isoprene and styrene having an average molecular weight in the range of 10,000 to 100,000.

16. The filling compound as claimed in claim 15 wherein said filling compound consists essentially of said substance and said viscosity index improver.

17. An electrical or optical equipment article containing the filling compound of claim 1.

18. The article as claimed in claim 17 wherein said filling compound fills the voids in an optical fiber cable.

19. A method of protecting electrical or optical equipment having void spaces, said method comprising filling the void spaces in the equipment to be protected with the filling compound as claimed in claim 1.

20. The method as claimed in claim 19 wherein said electrical or optical equipment comprises an optical cable.

21. A filling compound for electrical and optical equipment comprising
   a) a polyolefin stellate substance wherein the ratio of carbon atoms forming the main chain to carbon atoms forming the side chain is less than 1:3, said polyolefin stellate substance having a viscosity in the range of from 10 to 500 mm²/s at 40° C. according to ASTM D445 and a pour point below −25° C. according to ASTM D97; and
   b) at least one of (i), (ii), (iii), (iv) or (v):
      (i) up to 10% by weight of the polyolefin stellate substance of a high molecular weight polyolefin having a molecular weight greater than 0.5 million;
      (ii) up to 10% by weight of the polyolefin stellate substance of mineral oil;
      (iii) up to 20% by weight of the polyolefin stellate substance of a viscosity index improver;
      (iv) a dispersive effective amount of a dispersing aid;
      (v) at least one auxiliary;
said filling compound being characterized by the absence of an inorganic thixotropic agent.

22. The filling compound of claim 21 wherein the filling composition consists essentially of the polyolefin stellate substance and 1% to 5% by weight of mineral oil based on the weight of the polyolefin stellate substance.

23. The filling compound of claim 21 wherein the filling compound consists essentially of the polyolefin stellate substance and 0.05 to 2% by weight of the polyolefin stellate substance of the high molecular weight polyolefin.

24. The filling compound of claim 21 wherein the filling compound consists essentially of the polyolefin stellate substance, the high molecular weight polyolefin, and from 1% to 20% by weight, based on the polyolefin stellate substance, of the viscosity index improver.

25. The filling compound of claim 21 wherein the polyolefin stellate substance is a poly-α-olefin.

26. The filling compound of claim 25 wherein the poly-α-olefin is oligodec-1-ene.

27. The filling compound of claim 25 wherein at least 0.05% by weight of high molecular weight polyolefin is present, said high molecular weight polyolefin being selected from the group consisting of polyethylenes, polypropylenes, polyisobutylenes, polybutenes and mixtures and copolymers thereof.

28. The filling compound of claim 25 wherein at least 1% by weight of viscosity index improver is present, said viscosity index improver being selected from the group consisting of polyisobutenes, diene polymers, copolymers of ethylene and propylene, polyalkyl styrenes and hydrogenated copolymers of styrene and isoprene and having an average molecular weight in the range from 10,000 to 100,000.

29. The filling compound of claim 25 wherein said filling compound has a cone penetration of more than 200 mm/10 at −50° C. and resistance to flow up to a temperature of at least 80° C.

30. An electrical or optical equipment article containing the filling compound of claim 21.

31. The article as claimed in claim 30 wherein said filling compound fills the voids in an optical fiber cable.

32. A method of protecting electrical or optical equipment having void spaces, said method comprising filling the void spaces in the equipment to be protected with the filling compound of claim 21.

33. The method as claimed in claim 32 wherein said electrical or optical equipment comprises an optical cable.

* * * * *

UNITED STATES PATENT AND TRADEMARK OFFICE
CERTIFICATE OF CORRECTION

PATENT NO.      : 6,258,885 B1
DATED           : July 10, 2001
INVENTOR(S)     : Heucher et al.

It is certified that error appears in the above-identified patent and that said Letters Patent is hereby corrected as shown below:

Title Page,
Item [30], Foreign Application Priority Data, delete "Nov. 4, 1991", and insert therefor -- Nov. 7, 1991 --.

Column 7,
Line 11, delete "improver-", and insert therefor -- improver --.
Line 16, after "said" and before "substance", insert -- stellate --.

Signed and Sealed this

Ninth Day of September, 2003

JAMES E. ROGAN
*Director of the United States Patent and Trademark Office*